3,444,769
DEVICES FOR GUIDING LENGTHS OF PLATE ON
THE ENTRY SIDE OF TRIMMING SHEARS
Karl-Heinz Simon, Ratingen, Germany, assignor to
Schloemann Aktiengesellschaft, Dusseldorf, Germany, a company of Germany
Filed Aug. 4, 1966, Ser. No. 570,314
Claims priority, application Germany, Aug. 5, 1965,
Sch 37,500
Int. Cl. B26d 7/06
U.S. Cl. 83—420      1 Claim

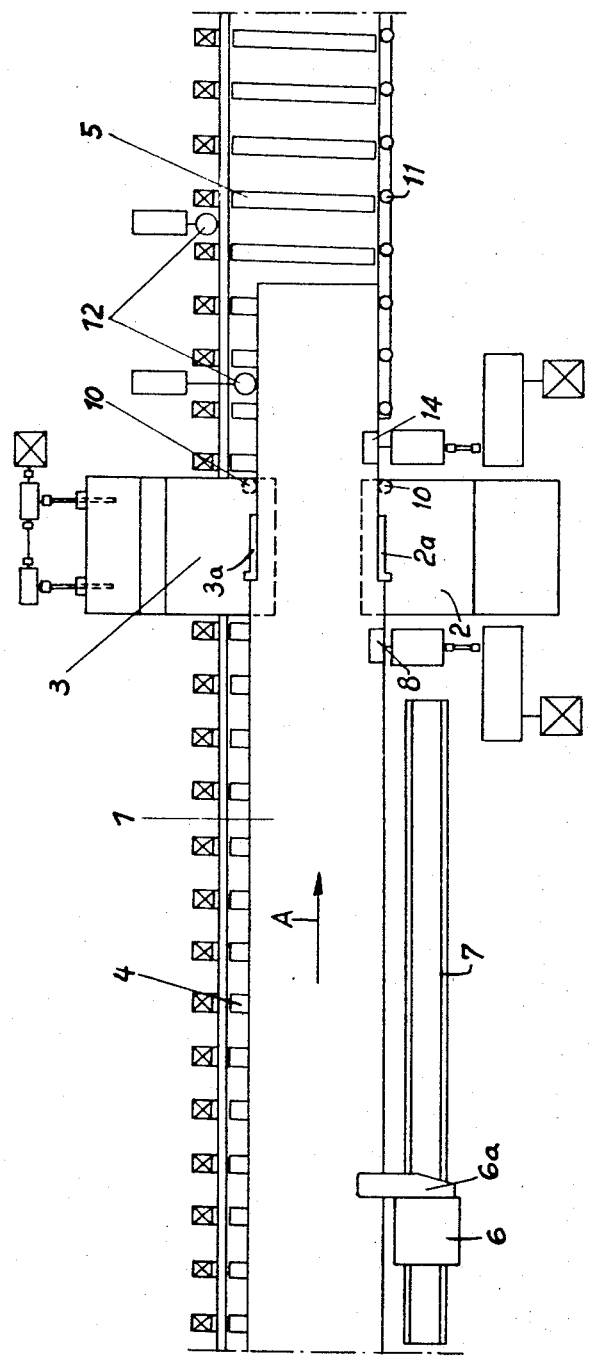

ABSTRACT OF THE DISCLOSURE

Trimming shears for sheet and plate, particularly for heavy plate, comprising a clamping device carried by a clamping carriage movable along a rail track on one side of a roller table carrying the plate to be trimmed, a stationary flat-knife shear on the same side of the roller table as the rail track, an adjustable flat-knife shear on the opposite side of the roller table, driving rollers engaging the surfaces of the plate along the edge adjacent to the rail track, vertical guide rollers bearing against both edges of the plate, as it leaves the shears and vertical pressure rollers bearing against one edge of the plate after it has passed the shears.

---

The invention relates to the introduction of sheet and plate, in particular heavy plate, into a double trimming shear situated behind plate rolling trains.

In the trimming of plate it is important for the lengths of plate to be introduced into the trimming line in a straight line parallel to the longitudinal axis in order to obtain a continuously straight and smooth cut.

It has already been proposed for this purpose to convey the length of plate at its end on a longitudinally sliding clamping carriage and to provide one or more pairs of drive rolls on each side of the length of plate in front of the trimming shears. The pairs of drive rolls are intended to feed the length of plate in conjunction with the roller table and where appropriate the clamping carriage, while the pairs of drive rolls and the claimping carriage are at the same time responsible for keeping the length of plate straight. However, an arrangement of this kind involves considerable construction costs since the pair of drive rolls fitted on the side of the trimming shear designed to be adjustable must also be adjustable to the same extent. In addition, the movement of the two pairs of drive rolls lying opposite one another must be synchronised as otherwise the plate distorts and it can no longer be kept straight. An accurate parallel arrangement of the pairs of drive rolls is also essential for accurate maintenance of the plate feed. If the bearing wear on opposite pairs of drive rolls is uneven this cannot be maintained and as a result the plate is inaccurately guided. Further reasons for changes in the straight guidance of the plate are possible wear of the drive rolls and uneven undulating edges on each side of the heavy plate.

The object of the invention is to improve the known devices for guiding lengths of plate on the entry side of trimming shears and to simplify the means used for plate guidance.

The invention therefore proposes the arrangement of one or more pairs of drive rolls in tandem on one side only on the longitudinal edge of the plate nearer the clamping carriage or the fixed trimming shear.

The invention thus adopts the method, at first sight an unusual one, of arranging one or more pairs of drive rolls on one side only of the plate, which appears to indicate inaccurate straightness as a result of drive guidance on only one side. In fact, however, the difficulties in keeping the plate straight which arise when pairs of drive rolls are arranged opposite one another are eliminated. For the slightest deviation in synchronisation and in the direction of drive results in changes in the guiding straightness of the plate and consequently in errors in the continuous trimming. In addition the arrangement has the advantage that one or more pairs of drive rolls can be mounted on the side of the fixed trimming shears, which provides structural advantages.

The invention will now be described with reference to the accompanying drawing, which shows an embodiment of the invention but in no restrictive sense. The drawing shows a diagrammatic plan view of a double trimming shear.

A heavy plate 1 is conveyed in the direction of arrow A to a fixed flat knife shear 2 and a transversely adjustable flat knife shear 3. The heavy plate 1 lies on a roller table 4 at the entry side and a roller table 5 at the delivery side of the trimming shear. The end of the heavy plate 1 is held straight by a clamping carriage 6 and a clamping device 6a and if necessary, in the case of discontinuous feed, is also supported in the region of the flat knives 2a and 3a. The clamping carriage 6 runs on rails along one side of the heavy plate 1 on the side of the fixed flat knife shear 2. Immediately in front of the flat blade shear 2 is a pair of drive rolls 8 which controls the discontinuous conveyance of the heavy plate 1 and also serves to keep the heavy plate 1 straight. Instead of the one pair of drive rolls 8, two pairs of automatically synchronised drive rolls in tandem are provided for heavier plate. Guide rollers 10 and a drive roll bar 11 and hydraulically adjustable pressure rollers 12 to guide the sheared heavy plate 1 are provided on the delivery side of the trimming shears. The pressure rollers 12 lie against one longitudinal side of the heavy plate 1 as soon as its front end has passed the pressure rollers 12. If necessary, another pair of drive rolls 14, also to keep the plate straight, is provided on the delivery side on the side of the fixed trimming shear 2. The rollers in the roller table 5 are mounted at an angle so that the heavy plate is brought to rest against the roll bar 11.

The guidance of the heavy plate 1 should only be effected by means of the pairs of drive rolls 8 together with the clamping carriage 6. When the clamping carriage at the end of the heavy plate 1 has to be disengaged for the end of the heavy plate to be trimmed, the plate is guided solely by the pair of drive rolls 8 together with the pressure rollers 12 mounted behind the trimming shear 2.

I claim:
1. Flat-blade trimming shears for plates and sheets, particularly for heavy plate, comprising: a roller table for conveying the plate to be trimmed to and past the shear, a rail track on one side of the roller table, a clamping carriage movable along the rail track, a clamping device carried by the clamping carriage and adapted to be clamped to the adjacent edge of the plate to be trimmed, a stationary flat-knife shear located on the same side of the roller table as the said rail track, an adjustable flat-knife shear located on the other side of the roller track, at least one pair of driving rollers engaging the surfaces of the plate to be trimmed along one edge only, namely the edge adjacent to the stationary shear and to the rail track, to assist the plate feed, vertical guide rollers bearing against both edges of the plate as it leaves the shears, and vertical pressure rollers bearing adjustably against one edge of the plate after it has passed the shears.

References Cited

UNITED STATES PATENTS

| | | | |
|---|---|---|---|
| 2,726,859 | 12/1955 | Dolamore | 271—59 X |
| 3,001,787 | 9/1961 | Socke | 271—59 X |
| 3,154,988 | 11/1964 | Greis | 83—420 X |

ANDREW R. JUHASZ, *Primary Examiner.*

U.S. Cl. X.R.

83—436